United States Patent
Soliman

[19]

[11] Patent Number: 6,166,685
[45] Date of Patent: Dec. 26, 2000

[54] WIRELESS USER POSITION UPDATE USING INFRASTRUCTURE MEASUREMENTS

[75] Inventor: Samir S. Soliman, San Diego, Calif.

[73] Assignee: Qualcomm Incorporated, San Diego, Calif.

[21] Appl. No.: 09/196,448

[22] Filed: Nov. 19, 1998

[51] Int. Cl.$^7$ ............................. G01S 5/02; H04B 7/185; H04Q 7/20

[52] U.S. Cl. ........................................ 342/357.1; 455/456

[58] Field of Search .......................... 342/357.1; 455/456

[56] References Cited

U.S. PATENT DOCUMENTS 5,873,040  2/1999  Dunn et al. .............................. 455/456

*Primary Examiner*—Thomas H. Tarcza
*Assistant Examiner*—Fred H. Mull
*Attorney, Agent, or Firm*—Philip Wadsworth; Bruce Greenhaus; Thomas R. Rouse

[57] ABSTRACT

A method and apparatus for tracking the position of a mobile unit in a mobile radio communication system using information from earth-orbiting satellites and information received from the infrastructure of the system, wherein the infrastructure consists of equipment associated with transmitting and receiving voice or data traffic to and from the mobile phone. An initial position of the mobile unit is calculated using measurements from earth-orbiting satellites. Next, one or more range measurements are made using signals transmitted between the mobile unit and the infrastructure. A positional difference between the initial position and a current position of the mobile station is estimated using the one or more range measurements, wherein only range measurements made from signals transmitted between the mobile unit and the infrastructure are used to perform the estimating. An accuracy value is next determined for the estimated positional measurement, and the accuracy value is compared to a threshold to determine whether the estimated positional measurement has an acceptable accuracy. If the estimated positional measurement has an acceptable accuracy, then the initial position of the mobile unit is updated using the estimated positional measurement and the process is repeated using only range measurements made from signals transmitted between the mobile unit and the infrastructure; otherwise, a new initial position is determined from the earth-orbiting satellites and the process is repeated.

22 Claims, 6 Drawing Sheets

WIRELESS USER POSITION UPDATE USING INFRASTRUCTURE MEASUREMENTS

I. FIELD OF THE INVENTION

The present invention relates generally to mobile radio communication systems. More particularly, the present invention relates to mobile radio communication systems where the position of the mobile radio unit is tracked as the unit moves about the system. Even more particularly, the present invention relates to a novel and improved system and method for tracking the position of a mobile radio unit which uses information from the Global Position Satellite (GPS) system to determine an initial position for the mobile unit, and thereafter updates position location using only terrestrial information measurements from base stations and the mobile unit.

II. DESCRIPTION OF THE RELATED ART

The Federal Communications Commission (FCC) has recently issued orders that will require that the location of a mobile unit be provided to a Public Safety Answering Point each time that a 911 call is made from the mobile unit. These FCC orders mandate that the location information have an accuracy within a radius of 125 meters of the actual position of the mobile unit. In addition to the FCC order, mobile service providers have begun to recognize that location services (i.e., services that identify the position of a mobile subscriber) can be used in various applications to provide value-added features that will generate further revenue for the service providers. For example, a service provider could use location services in order to provide a mobile subscriber with tiered service where the mobile user was charged at one rate if the mobile user was using the phone in one zone (e.g., near the user's home), and a different rate if the mobile user was using the phone in a different zone (e.g., outside or away from the user's home.) One purpose of such tiered service is to encourage a mobile user to use the mobile phone in the user's home (rather than the user's wired phone) by charging the user a lower rate for such calls. Tiered services require that the location of the mobile phone be tracked by the system or that the phone be able to continuously update its position. Other applications that a service provider could provide to subscribers using location services include asset tracking services, asset monitoring and recovery services, fleet management and dispatch services, and child and pet tracking services.

One method for tracking the position of a mobile phone is to add into the phone the capability to receive signals from the Global Positioning Satellite (GPS) system. Position location using the GPS system is well known, and results in a position determination that is accurate and reliable. Unfortunately, in order to determine the position of the mobile unit using the GPS system, the mobile phone must switch its receiver to a frequency associated with signals from the GPS system for a time sufficient to allow receipt of timing signals from the GPS system. While the mobile phone is tuned to the GPS frequency, the mobile phone's ability to receive voice traffic or data traffic (e.g., internet or fax information) is often substantially degraded or lost altogether.

It would therefore be desirable if there was a system for tracking the position of a mobile station which utilized the accuracy and reliability of positional measurements made using GPS, and which at the same time minimized the degradation in the delivery of voice and data transmission services which typically occurs when the mobile station is tuned to the GPS frequency.

SUMMARY OF THE INVENTION

The present invention is directed to a method and apparatus for tracking the position of a mobile unit in a mobile radio communication system using information from earth-orbiting satellites and information received from the infrastructure of the system, wherein the infrastructure consists of equipment associated with transmitting and receiving voice information to and from the mobile phone. An initial position of the mobile unit is calculated using measurements from earth-orbiting satellites. Next, one or more range measurements are made using signals transmitted between the mobile unit and the infrastructure. A positional difference between the initial position and a current position of the mobile station is estimated using the one or more range measurements, wherein only range measurements made from signals transmitted between the mobile unit and the infrastructure are used to perform the estimating. An accuracy value is next determined for the estimated positional measurement, and the accuracy value is compared to a threshold to determine whether the estimated positional measurement has an acceptable accuracy. If the estimated positional measurement has an acceptable accuracy, then the initial position of the mobile unit is updated using the estimated positional measurement and the process is repeated using only range measurements made from signals transmitted between the mobile unit and the infrastructure; otherwise, a new initial position is determined from the earth-orbiting satellites and the process is repeated.

In accordance with a further aspect, a receiver in the mobile unit is preferably switched from a frequency associated with voice traffic or data traffic (e.g., internet or fax information) to a frequency associated with the earth-orbiting satellites in order to make the positional measurements from the earth-orbiting satellites. After the satellite measurements have been made, the receiver in the mobile unit is tuned from the frequency associated with the earth-orbiting satellites back to the frequency associated with the voice or data traffic. Significantly, during the position updating process, the receiver in the mobile unit remains tuned to the voice or data traffic frequency because only measurements made using the system infrastructure are used to update the initial position. By minimizing the time periods when the mobile unit receiver must tune to the frequency of the earth-orbiting satellites, this aspect of the invention minimizes the degraded voice (or data) quality that may be associated with voice (or data) transmissions that occurs when the received at the mobile unit is tuned to the frequency of the earth-orbiting satellites.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

By way of an overview, in the present invention a highly accurate initial position of the mobile station is determined using information from both the Global Position Satellite (GPS) system and timing information derived from the infrastructure of a mobile radio telephone communication system. For purposes of the present invention, the "infrastructure" of a mobile radio telephone system shall include the equipment associated with transmitting and receiving voice information or data information (e.g., internet or fax information) to and from the mobile phone such as, for example, base stations, base station controllers, and mobile switching centers. Such infrastructure equipment could also include, for example, low-orbit earth satellites used for transmitting and receiving such voice or data information to and from mobile phones. Excluded from the definition of "infrastructure" are earth-orbiting satellites that are not used to transmit or receive such voice or data information to or from a mobile phone, such as those associated with the GPS system.

After the highly accurate initial position is determined using GPS measurements (and optionally also infrastructure measurements), the position of the mobile phone is updated based only on measurements made using the system infrastructure until it is decided that the update has a poor quality. The infrastructure measurements that are used to perform the position updating include, for example, forward (down) link measurements such as pilot phase offset and pilot strength. They also include reverse (up) link measurements such as round-trip-delay (RTD) and signal-to-noise ratio (SNR). The pilot phase offset is proportional to the difference in range between any base station and one being used as a reference $R_2 - R_1$. The round trip delay is a measure of twice the range between the base station and the mobile phone, $2R_1$ assuming reciprocity between up and down links propagation delay, also assuming that all other hardware delays are calibrated. Estimation of the change in position of a mobile station using various combinations of these infrastructure measurements is well known in the art. It is also well known that the estimation calculation itself can be made either at the mobile unit, or within the system infrastructure.

Figure 1:
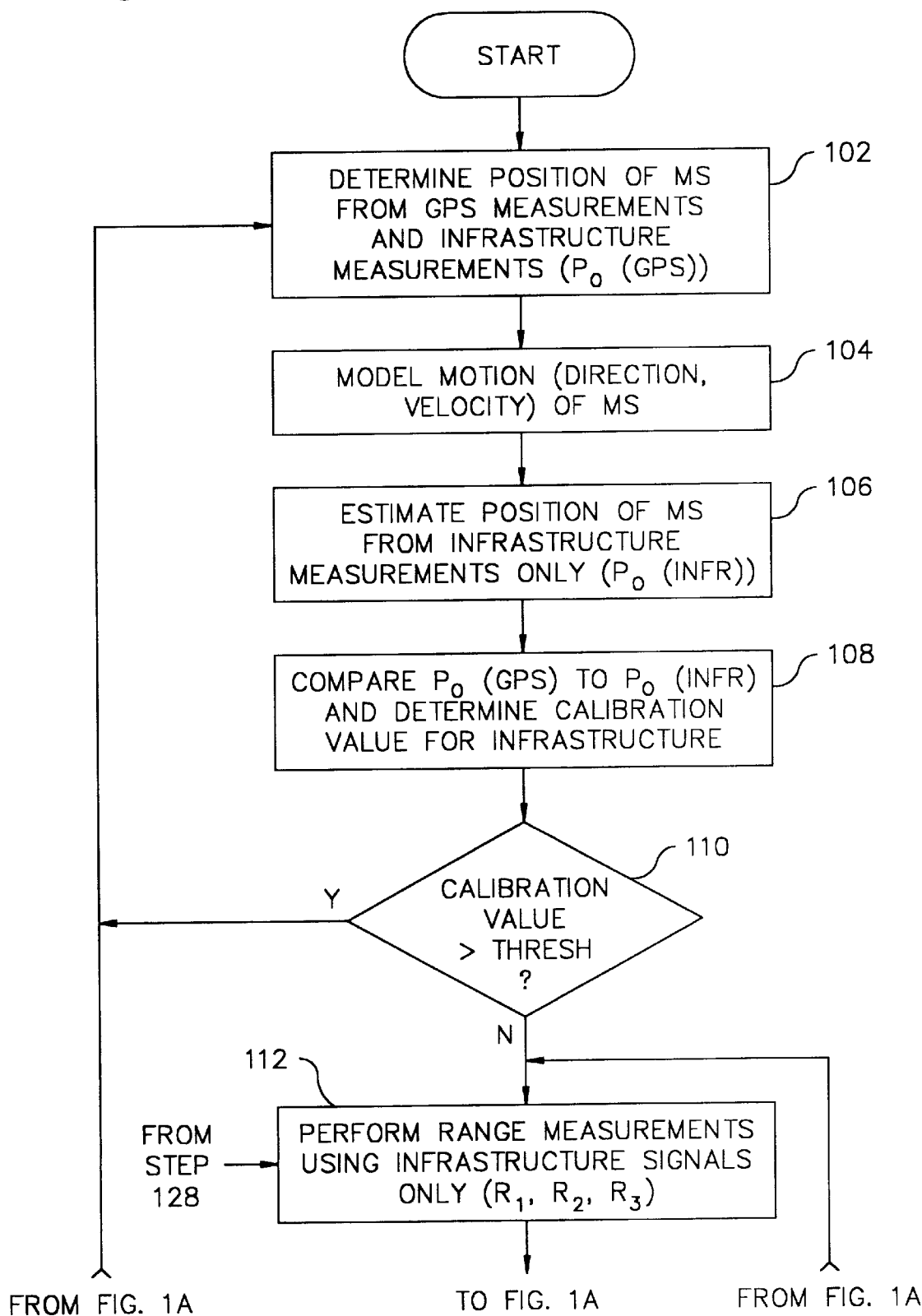
FIGS. 1, 1A and 1B depict the operation of a method for tracking the position of a mobile radio unit that uses only infrastructure measurements to update an initial position for the mobile unit determined using the GPS system, in accordance with a preferred embodiment of the present invention.
Figure 1A:
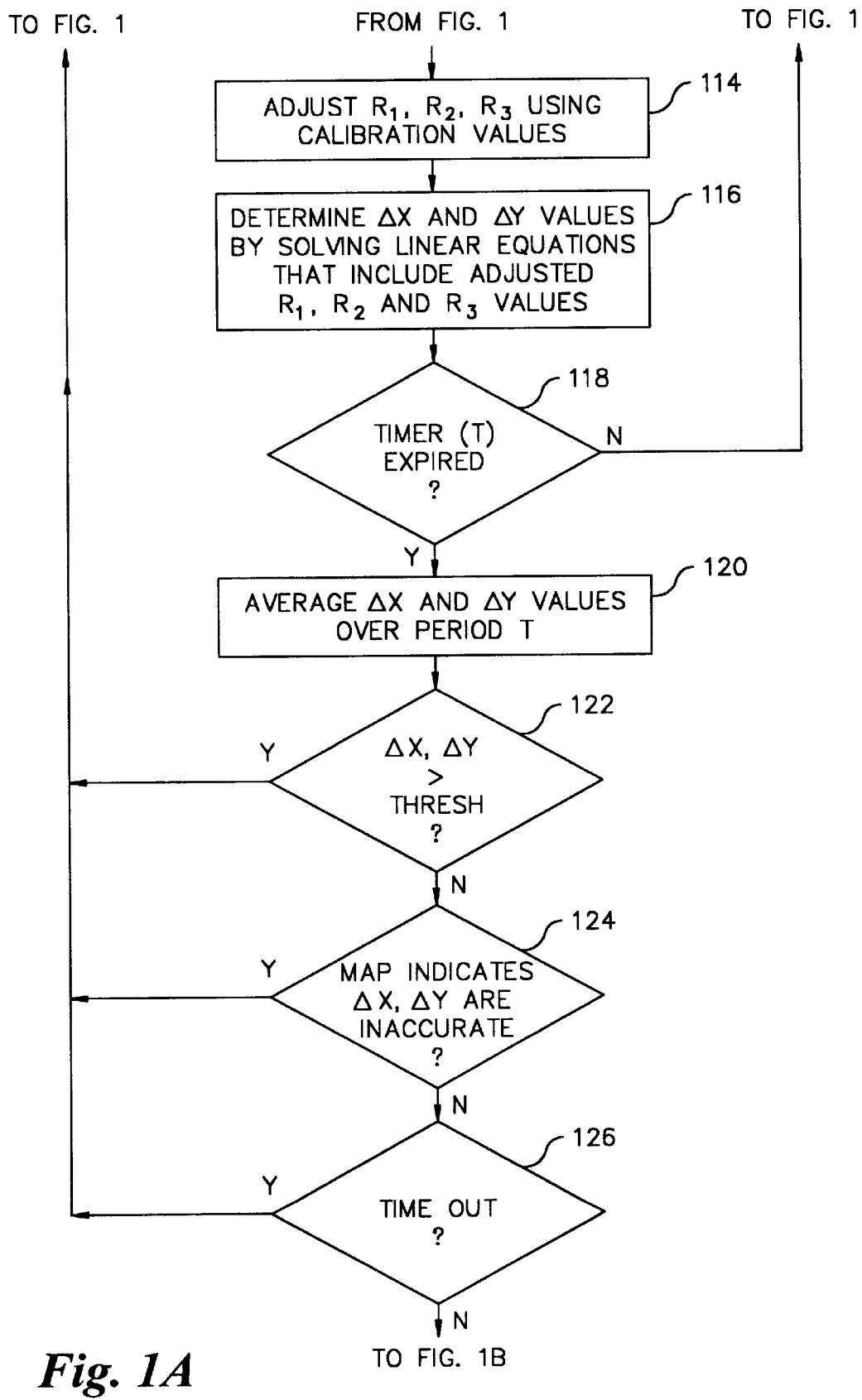
Figure 1B:
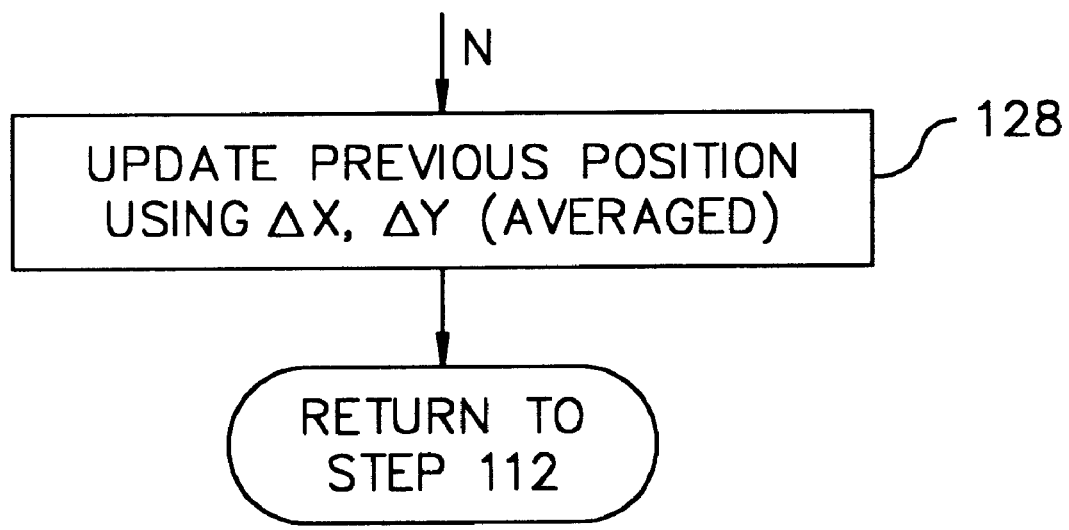

Referring now to FIGS. 1, 1A and 1B, there is shown a method 100 for tracking the position of a mobile radio unit that uses only infrastructure measurements to update an initial position for the mobile unit determined using the GPS system, in accordance with a preferred embodiment of the present invention. In step 102, a highly accurate initial position of the mobile phone is determined using measurements from both the GPS system and the system infrastructure. The highly accurate initial position ($P_{0\ (GPS)}$) determined is preferably determined in all three-dimensions in this step using differential GPS and in accordance with the method disclosed in U.S. Pat. No. 6,081,229, entitled "System and Method for Determining The Position of a Wireless CDMA Transceiver," filed Jun. 27, 2000, which is owned by the assignee of the present invention, and the contents of which are incorporated herein in their entirety by reference. In an alternate embodiment, the highly accurate initial position can be determined using at least three (and preferably more) terrestrial base stations in the system infrastructure.

In step 104, the motion of the mobile station is modeled (preferably using past positional measurements) in order to estimate the current direction and velocity of the mobile station. Map information, which places the mobile station on a street or highway, which is oriented in a known direction, may also be used to model the current direction of the mobile station. Filtering methods can further enhance this trajectory estimation technique. A good example is to use a Kalman filter to adaptively track the mobile trajectory and hence predict its dynamic state in terms of speed and position.

In step 106, the initial position of the mobile station is estimated from positional measurements made using only the system infrastructure ($P_{0\ (INFR)}$). The infrastructure measurements that are used to perform the position determination in this step include, for example, forward (down) link measurements such as pilot phase offset and pilot strength. They also include reverse (up) link measurements such as round-trip-delay (RTD) and signal-to-noise ratio (SNR). As stated above, estimation of the position of a mobile station using various combinations of these infrastructure measurements is well known in the art, and it is also well known that the calculation of the position in this step can be made either at the mobile unit, or within the system infrastructure. In a preferred embodiment, the positional determination ($P_{0\ (INFR)}$) made in step 106, is performed using two measurements: (i) a phase offset measured at the mobile station of a pilot signal sent to the mobile station from a first base station (which places the mobile station on a hyperbola), and (ii) a round trip delay measurement between the mobile station and a second base station (which places the mobile station on a circle).

In step 108, the infrastructure system is aligned or calibrated by comparing the positional determinations ($P_{0\ (GPS)}$, $P_{0\ (INFR)}$) made in steps 102 and 106. In a preferred embodiment, the range measurements used for determining the coordinates associated with the two positional determinations ($P_{0\ (GPS)}$, $P_{0\ (INFR)}$) are compared, and the residual values that result from this comparison correspond to the difference (R1–R2) between a first range (R1) from a reference point (e.g., a base station) to $P_{0\ (GPS)}$ and a second range (R2) from the same reference point to $P_{0\ (INFR)}$. This difference is then divided by the speed of light in order to arrive at a calibration value that represents the time difference between the propagation time of a signal transmitted between a base station and $P_{0\ (GPS)}$, and the propagation time of a signal transmitted between the base station and $P_{0\ (INFR)}$. This calibration value is then used by the present invention to adjust range measurements made using the infrastructure on the forward and reverse links associated with the mobile station as described more fully below.

In step 110, the calibration value is compared to a threshold in order to assess the accuracy of the positional determination ($P_{0\ (INFR)}$) made using only the infrastructure measurements in step 106. If the calibration measurement exceeds the threshold, this indicates that the positional determination ($P_{0\ (INFR)}$) made using only the infrastructure measurements was sufficiently inaccurate that further updates of the initial positional measurement should not be made using infrastructure measurements only. In such cases, the system returns to step 102, and the position of the mobile station is updated simply by taking a new set of GPS measurements.

In steps 112–116, one or more range measurements ($R_1$, $R_2$, $R_3$) are made using the infrastructure only, each range measurement is first adjusted (in step 114) by subtracting the calibration value from the measurement, and then the difference between the initial position of the mobile station and the current position of the mobile station ($\Delta x$, $\Delta y$) is determined used the adjusted range measurements (step 116). As discussed more fully below, steps 112–116 can alternatively be performed using three range measurements, two range measurements, or a single range measurement. In a preferred embodiment, the first range measurement is preferably based on a phase offset associated with transmission of a pilot signal between the mobile unit and a first base station antenna. The phase offset can be used to determine the value $2R_1$ (twice the distance between the mobile station and the first base station antenna), from which $R_1$ can easily be calculated. The second range measurement may then be based on a phase offset associated with transmission of the pilot signal from the mobile unit to a second base station antenna. This further phase offset can be used to determine the value $R_1+R_2$, from which $R_2$ can easily be calculated given that $R_1$ is known from the first range measurement. Similarly, the third range measurement may be based on a phase offset associated with transmission of the pilot signal from the mobile unit to a third base station antenna. This further phase offset can be used to determine the value $R_1+R_3$, from which $R_3$ can easily be calculated given that $R_1$ is known from the first range measurement.

Figure 2:
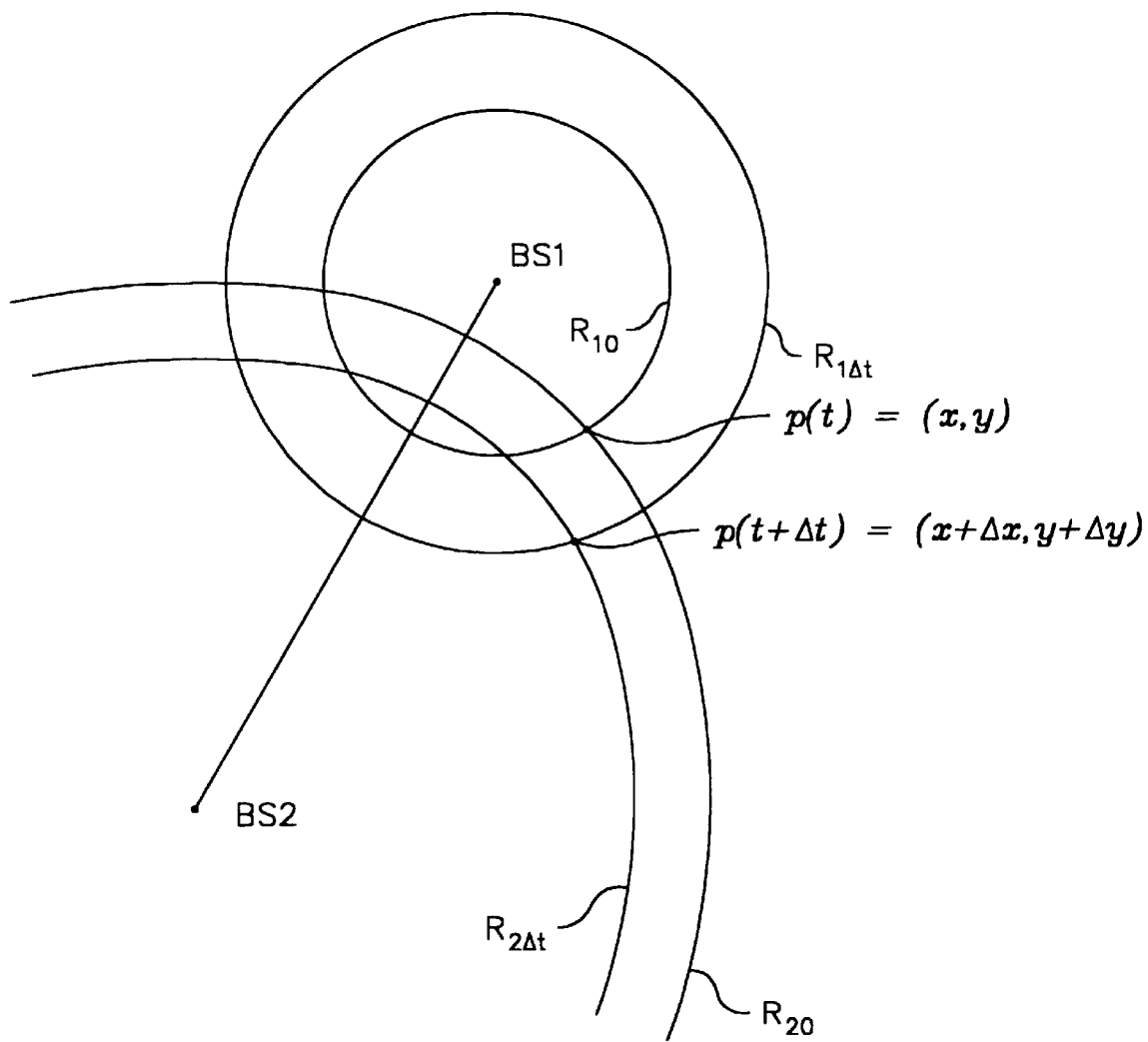
FIG. 2 illustrates how a change in position of the mobile station is determined using infrastructure measurements, in accordance with the present invention.

In the three alternate embodiments for determining the change in position of the mobile station from the adjusted infrastructure range measurements, the position of a base station i is denoted $(x_i, y_i)$, $p(t_0)=(x_0, y_0)$ is and used to denote the location of the mobile station at time $t_0$, and the range measurement between the mobile station and the base station i at time $t_0$ is denoted $R_{i0}$, see FIG. 2. Equation (1) below governs the range measurements between the mobile unit and the base stations:

$$R^2_{oi}=(x_o-x_i)^2+(y_o-y_i)^2 \quad (1)$$

When the mobile unit moves to point $p(t+\Delta t)$ which is at a distance ($\Delta x$, $\Delta y$) from $p(t_0)=(x_0, y_0)$, the new range measurements between the mobile unit and the base stations are governed by equation (2) below:

$$(R_i)^2=(x_0+\Delta x-x_i)^2+(y_0+\Delta y-y_i)^2 \quad (2)$$

Equation (2) for i=1,2 represents two circles which intersect at two points (see FIG. 2). The new position of the mobile station can be found by selecting the point closest to $p(t_0)$.

Subtracting (2) from (1), yields, $$(R_i)^2-(R_{0i})^2=2\Delta x(x_0-x_i)+2\Delta y(y_o-y_i)+(\Delta x)^2+(\Delta y)^2 \quad (3)$$

Equation (3) may be reduced to a linear equation by ignoring the last two elements (i.e., $\Delta x^2$, $\Delta y^2$) which are small compared to the remaining elements in the equation. As explained more fully below, when range measurements are available from two or three base stations, equation (3) can be applied in its reduced linear form to solve for the distance ($\Delta x$, $\Delta y$). By using linear equations to solve for the distance ($\Delta x$, $\Delta y$), the present invention can provide a value for the distance ($\Delta x$, $\Delta y$) without having to solve non-linear equations. In addition, unknown hardware delays and channel impairments can be calibrated out.

In cases where range measurements from three base stations are available, the determination of the distance ($\Delta x$, $\Delta y$) can be reduced to solving a system of two linear equations each of which represents an application of the "reduced" version of equation (3) applied between a pair of base stations:

$$(R^2_2-R^2_{o2})-(R^2_1-R^2_{o1})=2\Delta x(x_1-x_2)+2\Delta y(y_1-y_2) \quad (4)$$

$$(R^2_3-R^2_{o3})-(R^2_1-R^2_{o1})=2\Delta x(x_1-x_3)+2\Delta y(y_1-y_3) \quad (5)$$

The above system of linear equations can be written as $$\begin{bmatrix} 2(x_1-x_2) & 2(y_1-y_2) \\ 2(x_1-x_3) & 2(y_1-y_3) \end{bmatrix} \begin{bmatrix} \Delta x \\ \Delta y \end{bmatrix} = \begin{bmatrix} (R^2_2-R^2_{02})-(R^2_1-R^2_{o1}) \\ (R^2_3-R^2_{03})-(R^2_1-R^2_{o1}) \end{bmatrix} \quad (6)$$

and equation (6) can be written in simplified form as equation (7) below:

$$Az=B \quad (7)$$

The system of linear equations in (7) can be solved for z in order to determine $\Delta x$ and $\Delta y$. In solving equation (7) for z, the values $X_1$, $X_2$, $X_3$, $Y_1$, $Y_2$ and $Y_3$ are all known, as these are the coordinates of the base stations in the system. The values in B can be measured using both the mobile station and the base station in accordance with equation (8) below:

$$R^2_i-R^2_j=(R_i-R_j)(R_i+R_j)=\phi\tau \quad (8)$$

where $\phi$ is the pilot phase offset between base stations i and j (the pilot from one of these base stations is used as a reference and the pilot from the other base station is a non-reference pilot used for determining the phase offset from the reference pilot), and $\tau$ is the round trip delay between the mobile station and the base station associated with the non-reference pilot signal. Ranges $R_i$ and $R_j$ could be measured at the two base stations with other means. Note that the solution obtained from equation (7) is an exact solution and no approximation is involved.

In cases where range measurements from only two base stations are available, the determination of the distance ($\Delta x$, $\Delta y$) can also be accomplished by solving a system of linear equations. As noted above, equation (3) can be reduced or approximated by equation (9) below:

$$(R_i)^2-(R_{0i})^2 \approx 2\Delta x(x_0-x_i)+2\Delta y(y_0-y_i) \quad (9)$$

For i=1,2, equation (9) can be written as $$\begin{bmatrix} 2(x_0-x_2) & 2(y_0-y_2) \\ 2(x_0-x_1) & 2(y_0-y_1) \end{bmatrix} \begin{bmatrix} \Delta x \\ \Delta y \end{bmatrix} \cong \begin{bmatrix} (R^2_2-R^2_{02}) \\ (R^2_1-R^2_{01}) \end{bmatrix} \quad (10)$$

Equation (10) can be written in simplified form as equation (11) below:

$$Cz \approx D \quad (11)$$

The system of linear equations in (11) can be solved for z in order to determine $\Delta x$ and $\Delta y$ given infrastructure measurements from only two base stations.

In cases where range measurements from only a single base station are available, the determination of the distance ($\Delta x$, $\Delta y$) can also be accomplished if the direction of travel (m) of the mobile station is known from the modeling performed in step 104. In such cases, the $\Delta x$ and $\Delta y$ values can be determined by solving equations (12) and (13) below:

$$R^2_1-R^2_{o1}=2\Delta x\,(x_o-x_1)+2\Delta y(y_o-y_1) \quad (12)$$

$$\Delta y=m\Delta x \quad (13)$$

Solution of equations (12) and (13) represents a practical method for solving for $\Delta x$ and $\Delta y$, because once the system determines the initial position of the mobile station (step 102), it is possible using computer mapping to determine the street or highway the mobile is travelling on and the slope (m) or angular orientation of the road or highway. The sign of the vector $R_1$-$R_{01}$ is then used to determine the direction of travel of the mobile station. Solving equations (12) and (13), yields $$\Delta x \approx ((R_1)^2-(R_{01})^2)/(2(x_0-x_1)-2m(y_0-y_1)) \quad (14)$$

$$\Delta y \approx m((R_1)^2-(R_{01})^2)/(2(x_0-x_1)-2m(y_0-y_1)) \quad (15)$$

Typically, the position update is done at the infrastructure side (e.g., base station, base station controller or other control center). In addition, the determination of $\Delta x$ and $\Delta y$ and the updating of the position of the mobile station can be done at the mobile station too if the following information was sent to it by the system infrastructure: (i) the location of a first base station $x_1$, $y_1$, (ii) the initial position $x_0$, $y_0$ of the mobile station from step 102, (iii) the slope or orientation (m) of the street that the mobile station is traveling, and (iv) the distance $R_1$.

Referring again to FIG. 1, after the individual values for $\Delta x$ and $\Delta y$ are calculated, in step 118 the process of making the infrastructure measurements and determining the $\Delta x$ and $\Delta y$ values for each set of measurements (steps 112–116) is repeated over a period of time until a timer times out. A plurality of successively calculated values of $\Delta x$ and $\Delta y$ are generated during the period that the timer is active, and then in step 120 these values are averaged. In a preferred embodiment, separate $\Delta x$ and $\Delta y$ values are calculated every 20 ms, and these values are then averaged over a period of 1 second (i.e., the period of the timer used in step 118) in order to filter the individual $\Delta x$ and $\Delta y$ values calculated using steps 112–116.

In step 122, the averaged $\Delta x$ and $\Delta y$ values from step 120 are compared to a threshold. The purpose of the threshold in step 122 is to assess whether the positional measurements made using only the infrastructure in steps112–116 indicate that there has been a large change in the position of the mobile station since the position of the mobile was last updated. If this assessment indicates such a large change, then the system concludes that the averaged $\Delta x$ and $\Delta y$ values from step 120 may be too inaccurate and the update process has degraded to the extent that the system needs a new GPS measurement. In such cases, the system returns to step 102 and the process begins again by determining a new highly reliable initial position using GPS measurements. The value of the threshold used in step 124 is a matter of design choice and represents the limit that a system designer is willing to risk inaccuracies in the position of the mobile station before replacing the current position with a new highly reliable value using GPS measurements.

In step 124, the averaged $\Delta x$ and $\Delta y$ values from step 120 are compared to the modeled position of the mobile station from step 104 in order to determine whether, for example, the averaged $\Delta x$ and $\Delta y$ values place the mobile station on a street where it would be unlikely for the mobile to be traveling given the last prior position of the mobile station. Again, the purpose of step 124 is to assess whether, based on the map information and modeling information from step 104, the positional measurements made using only the infrastructure in steps 112–116 may be too inaccurate to use for updating the position of the mobile station. If this is the case, the system returns to step 102 and the process begins again by determining a new highly reliable initial position using GPS measurements.

Next, the system checks in step 126 to determine whether a further timer has expired. In the preferred embodiment of the present invention, updating the position of the mobile station using only infrastructure measurements continues at most for a predetermined amount of time afterwhich the system returns to step 102 and the process begins again by determining a new highly reliable initial position using GPS measurements. In one embodiment, this timer may be set to about three minutes. However, the limit of this timer is a matter of design choice and represents the limit that a system designer is willing to allow the positional measurement of the mobile station to decay before replacing the positional measurement with a new highly reliable value using GPS measurements.

Finally, in step 128, if the averaged $\Delta x$ and $\Delta y$ values from step 120 are not rejected in steps 122–126, then the averaged $\Delta x$ and $\Delta y$ values from step 120 are used to update the previous position of the mobile station, and the process is then repeated from step 128.

In the preferred embodiment of method 100, a receiver (e.g., analog receiver 334 shown in FIG. 3) in the mobile unit is preferable switched temporarily from a frequency associated with voice or data (e.g., internet or fax) traffic to a frequency associated with the GPS system in order to make the positional measurements from the GPS system in step 102. After the GPS measurements have been made, the receiver in the mobile unit is then immediately tuned from the frequency associated with GPS back to the frequency associated with the voice or data traffic. Thus, during the remainder of position updating process (i.e., steps 104–128), the receiver in the mobile unit remains tuned to the voice or data traffic frequency because only measurements made using the system infrastructure are used to update the initial position during these further steps.

Figure 3:
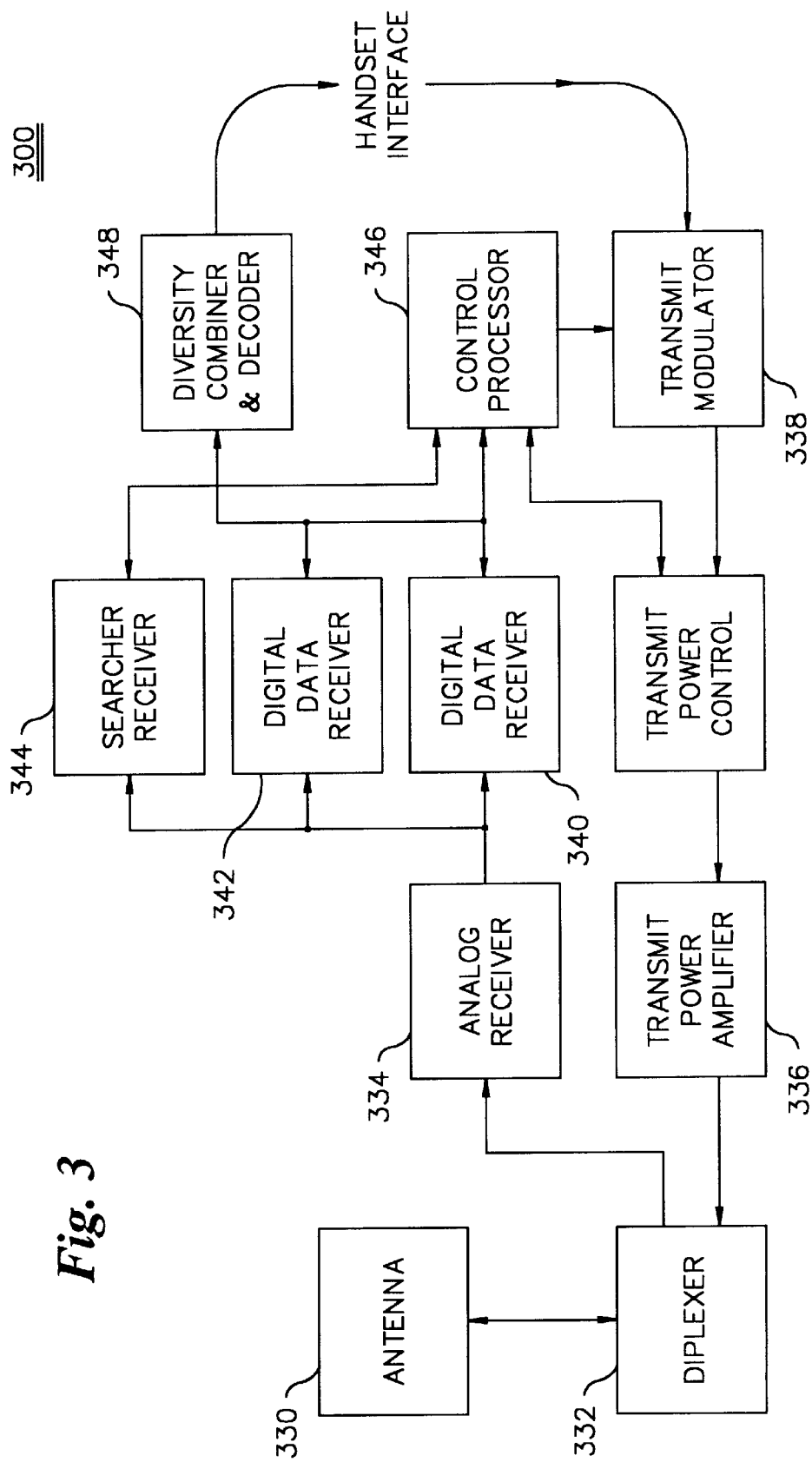
FIG. 3 is a block diagram showing the components of an exemplary mobile station used for implementing the position tracking system of the present invention.

Referring now to FIG. 3, there is a block diagram showing the components of an exemplary code division multiple access (CDMA) mobile station 300 used for implementing the position tracking system of the present invention. The mobile station includes an antenna system 330, which is coupled through diplexer 332 to analog receiver 334 and transmit power amplifier 336. Antenna system 330 and diplexer 332 are of standard design and permit simultaneous reception and transmission through one or more antennas. Antenna system 330 optionally includes one antenna for voice traffic, and a separate antenna for receiving GPS signals. Antenna system 330 collects signals transmitted to the mobile station from one or more base stations and the GPS system, and provides the signals though diplexer 332 to analog receiver 334. Receiver 334 is also provided with an analog to digital converter (not shown). Receiver 334 receives RF signals from diplexer 332, amplifies and frequency downconverts the signals, and provides a digitized output signal to digital data receivers 340, 342 and to search receiver 344. It will be understood that, although in the embodiment in FIG. 3 only two digital data receivers are shown, a low performance mobile station might have only a single digital data receiver while higher performance units will have two or more digital data receivers to permit diversity reception. The outputs of receivers 340 and 342 are provided to diversity and combiner circuitry 348 which time adjusts the two streams of data received from the receivers 340 and 342, adds the streams together and decodes the result. Details concerning the operation of the digital data receivers 340, 342, the search receiver 344, and the diversity combiner and decoder circuitry 348 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 348 to control processor 346. The output signal from the decoder will include, for example, any of the pilot signals from the base stations that will be used for making positional measurements, timing signals received from the GPS system, and other information such as modeling information and base station position information sent from a base station to the mobile unit. In response to this information, the control processor 346 determines and attempts to update the position of the mobile station in accordance with method 100. All the steps of method 100 (except step 104) are preferably implemented in software on control processor 346, although it will be understood by those skilled in the art that many of these steps could alternatively be implemented in the system infrastructure. In response to the inputs described above, control processor 346 sends signals to the transmit modulator 338, which modulates control messages generated at the control processor 346 in accordance with spread spectrum modulation for transmission to an appropriate base station. The control messages may include, for example, the current updated position of the mobile station as determined using method 100.

Figure 4:
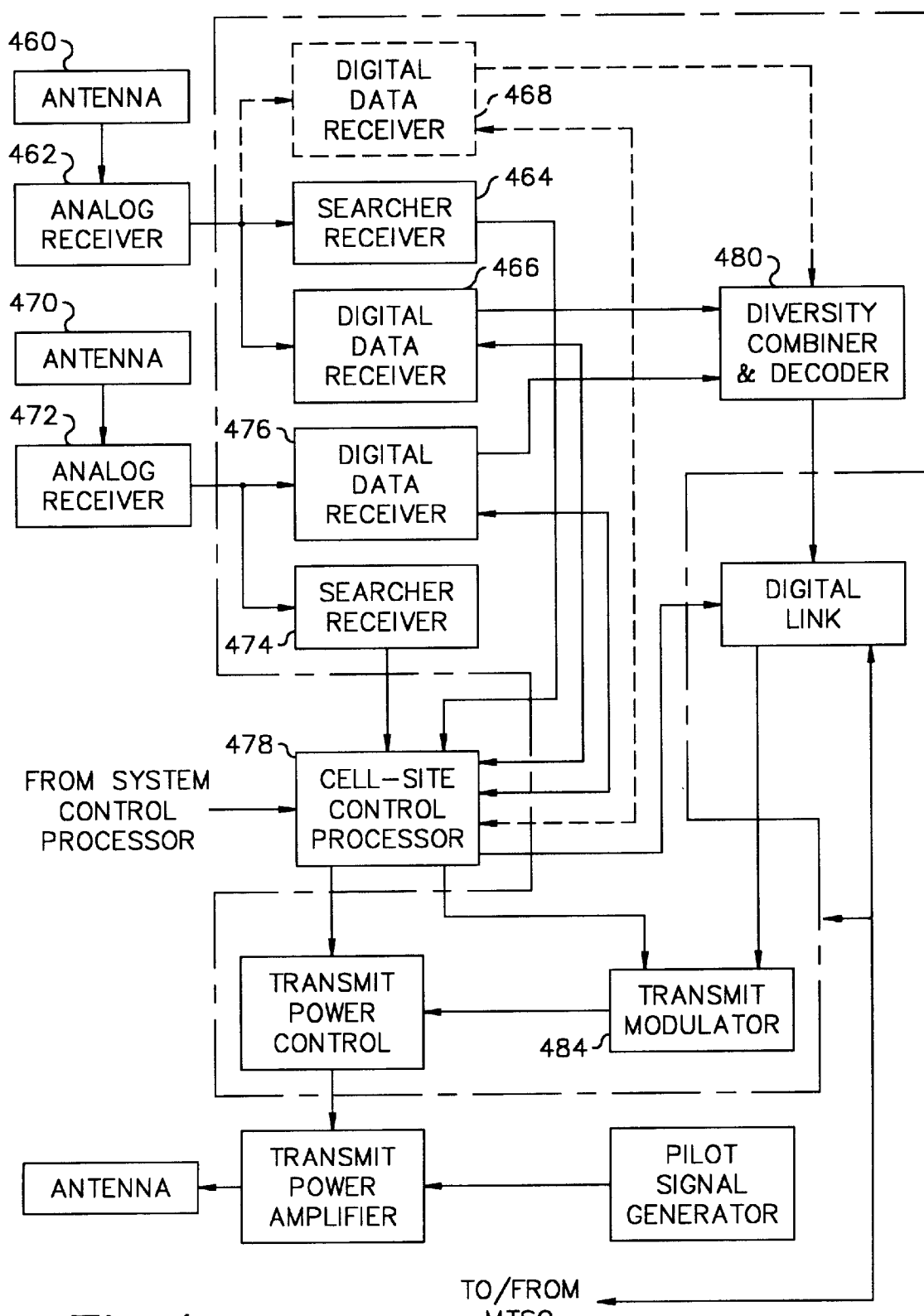
FIG. 4 is a block diagram showing the components of an exemplary base station used for implementing the position tracking system of the present invention.

Referring now to FIG. 4, there is shown a block diagram of the components of an exemplary CDMA base station 400 used for implementing the position tracking system of the present invention. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 4, the first receiver system is comprised of antenna 460, analog receiver 462, searcher receiver 464 and digital data receivers 466 and 468. The second receiver system includes antenna 470, analog receiver 472, searcher receiver 474 and digital data receiver 476. Cell-site control processor 478 is used for signal processing and control. Among other things, cell site processor 478 monitors the signals sent to and received from a mobile station in order to determine the round trip delay values used in the present invention, and this processor is also preferably used for performing the modeling of the mobile position in step 104. Cell site processor 478 also functions to cause the base station to send round trip delay measurements and modeling information such as the orientation of the trajectory of the mobile station to the mobile station. Finally, the position update process described herein can also be performed at cell site processor 478.

Both receiver systems are coupled to diversity combiner and decoder circuitry 480. A digital link 482 is used to communicate signals from and to a base station controller or data router under the control of control processor 478. Signals received on antenna 460 are provided to analog receiver 462, where the signals are amplified, frequency translated and digitized in a process identical to that described in connection with the mobile station analog receiver. The output from the analog receiver 462 is provided to digital data receivers 466 and 468 and searcher receiver 464. The second receiver system (i.e., analog receiver 472, searcher receiver 474 and digital data receiver 476) processes the received signals in a manner similar to the first receiver system. The outputs of the digital data receivers 466, 476 are provided to diversity combiner and decoder circuitry 480, which processes the signals in accordance with a decoding algorithm. Details concerning the operation of the first and second receiver systems and the diversity combiner and decoder 980 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 484 under the control of processor 478. Transmit modulator 484 modulates the data for transmission to the intended recipient mobile station.

Although the present invention has been described in connection with mobile radio communication systems that use CDMA modulation for transmitting signals between the mobile station and the base stations in the system, it will be understood by those skilled in the art that the teachings of the present invention could be applied in mobile radio communications that use other modulation methods such as, for example, time division multiple access modulation, for communicating between the mobile station and base stations in the system.

The previous description of the preferred embodiments is provided to enable any person skilled in the art to make or use the present invention. Various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for tracking a position of a mobile unit in a mobile radio communication system using information from earth-orbiting satellites and information received from infrastructure of the system, wherein the infrastructure consists of equipment associated with transmitting and receiving voice or data traffic to and from the mobile phone, comprising the steps of:
   (A) calculating an initial position of the mobile unit using measurements from the earth-orbiting satellites;
   (B) calculating first and second range measurements using first and second signals transmitted between the mobile unit and the infrastructure;
   (C) estimating a positional difference between the initial position and a current position of the mobile station with the first and second range measurements, wherein only range measurements made from signals transmitted between the mobile unit and infrastructure are used to perform the estimating;
   (D) determining an accuracy value associated with the positional difference estimated in step (C), and comparing the accuracy value to a first threshold to determine whether the positional difference estimated in step (C) has an acceptable accuracy;
   (E) if the positional difference estimated in step (C) has an acceptable accuracy, then updating the initial position using the positional difference and repeating steps (B)–(D); and
   (F) if the positional difference estimated in step (C) does not have an acceptable accuracy, then repeating steps (A)–(D).

2. The method of claim 1, wherein step (A) further comprises the steps of:
   (1) tuning a receiver in the mobile unit to a frequency associated with the earth-orbiting satellites;
   (2) while the receiver in the mobile unit is tuned to the frequency associated with the earth orbiting-satellites, making positional measurements using signals from the earth-orbiting satellites;

(3) after step (A)(2), tuning the receiver in the mobile unit from the frequency associated with the earth-orbiting satellites to a frequency associated with the voice or data traffic; and (4) calculating the initial position of the mobile unit using the positional measurements made in step (A)(2).

3. The method of claim 2, wherein step (A)(1) comprises tuning the receiver in the mobile unit from the frequency associated with the voice or data traffic to the frequency associated with the earth-orbiting satellites.

4. The method of claim 3, wherein steps (B)–(E) are performed while the receiver in the mobile unit is tuned to the frequency associated with the voice or data traffic.

5. The method of claim 4, wherein step (A)(4) comprises calculating the initial position of the mobile unit using the positional measurements made in step (A)(2) and further positional measurements made from signals transmitted between the mobile unit and the infrastructure.

6. The method of claim 4, wherein the first range measurement determined in step (B) is based on a round-trip-delay associated with transmission of the first signal between the mobile unit and a first base station antenna associated with the infrastructure.

7. The method of claim 4, wherein the second range measurement determined in step (B) is based on a round-trip-delay associated with transmission of the second signal between the mobile unit and a second base station antenna associated with the infrastructure.

8. The method of claim 4, wherein the first range measurement determined in step (B) is based on a phase offset associated with transmission of a pilot signal between the mobile unit and a first base station antenna associated with the infrastructure, and the second range measurement determined in step (B) is based on a phase offset associated with transmission of a pilot signal between the mobile unit and a second base station antenna associated with the infrastructure.

9. The method of claim 4, wherein step (B) further comprises calculating a third range measurement using a third signal transmitted between the mobile unit and the infrastructure, and the estimating in step (C) is performed using the first, second and third range measurements.

10. The method of claim 4, wherein step (A) further comprises:

(5) determining a position of the mobile unit using only range measurements made from signals transmitted between the mobile unit and the infrastructure;

(6) calibrating the initial position determined in step (A)(4) by determining a plurality of calibration values, wherein the calibration values are determined by subtracting values representing the initial position determined in step (A)(4) from values representing the position of the mobile unit determined in step (A)(5).

11. The method of claim 10, wherein step (A) further comprises:

(7) comparing the calibration values to a second threshold and, if the calibration values exceed the second threshold then repeated steps (A)(1)–(A)(6) until the calibration values do not exceed the second threshold.

12. The method of claim 10, wherein step (B) further comprises the step of adjusting the first and second range measurements in accordance with the calibration values.

13. The method of claim 12, wherein step (C) further comprises determining the positional difference value by averaging a plurality of interim difference values each of which is determined using a different set of first and second range measurements made in accordance with step (B).

14. The method of claim 1, wherein step (D) comprises:

determining the accuracy value by comparing a value representative of the positional difference estimated in step (C) to a first threshold, and if the value representative of the positional difference estimated in step (C) is less than the first threshold, then determining that the positional difference estimated in step (C) has an acceptable accuracy.

15. The method of claim 1, wherein the accuracy value in step (D) corresponds to a current timer value, and the current timer value is compared in step (D) to a time-out threshold to determine whether the positional difference estimated in step (C) has an acceptable accuracy.

16. A method for tracking a position of a mobile unit in a mobile radio communication system using information from earth-orbiting satellites and information received from infrastructure of the system, wherein the infrastructure consists of equipment associated with transmitting and receiving voice or data traffic to and from the mobile phone, comprising the steps of:

(A) calculating an initial position of the mobile unit using measurements from earth-orbiting satellites and determining directional and velocity values associated with the mobile unit;

(B) calculating a first range measurement using a first signal transmitted between the mobile unit and the infrastructure;

(C) estimating a positional difference between the initial position and a current position of the mobile station with the first range measurement and the directional and velocity values, wherein only the directional and velocity values and one or more range measurements made from signals transmitted between the mobile unit and the infrastructure are used to perform the estimating;

(D) determining an accuracy value associated with the positional difference estimated in step (C), and comparing the accuracy value to a first threshold to determine whether the positional difference estimated in step (C) has an acceptable accuracy;

(E) if the positional difference estimated in step (C) has an acceptable accuracy, then updating the initial position using the positional difference and repeating steps (B)–(D); and (F) if the positional difference estimated in step (C) does not have an acceptable accuracy, then repeating steps (A)–(D).

17. A method for tracking a position of a mobile unit in a mobile radio communication system using information received from infrastructure of the system, wherein the infrastructure consists of equipment associated with transmitting and receiving voice or data traffic to and from the mobile phone, comprising the steps of:

(A) calculating an initial position of the mobile unit using measurements from at least three different terrestrial base stations;

(B) calculating first and second range measurements using first and second signals transmitted between the mobile unit and the infrastructure;

(C) estimating a positional difference between the initial position and a current position of the mobile station with the first and second range measurements, wherein only range measurements made from signals transmitted between the mobile unit and infrastructure are used to perform the estimating;

(D) determining an accuracy value associated with the positional difference estimated in step (C), and comparing the accuracy value to a first threshold to determine whether the positional difference estimated in step (C) has an acceptable accuracy;

(E) if the positional difference estimated in step (C) has an acceptable accuracy, then updating the initial position using the positional difference and repeating steps (B)–(D); and (F) if the positional difference estimated in step (C) does not have an acceptable accuracy, then repeating steps (A)–(D).

18. A method for tracking a position of a mobile unit in a mobile radio communication system using information received from infrastructure of the system, wherein the infrastructure consists of equipment associated with transmitting and receiving voice or data traffic to and from the mobile phone, comprising the steps of:

(A) calculating an initial position of the mobile unit using measurements from at least three different terrestrial base stations and determining directional and velocity values associated with the mobile unit;

(B) calculating a first range measurement using a first signal transmitted between the mobile unit and the infrastructure;

(C) estimating a positional difference between the initial position and a current position of the mobile station with the first range measurement and the directional and velocity values, wherein only the directional and velocity values and one or more range measurements made from signals transmitted between the mobile unit and the infrastructure are used to perform the estimating;

(D) determining an accuracy value associated with the positional difference estimated in step (C), and comparing the accuracy value to a first threshold to determine whether the positional difference estimated in step (C) has an acceptable accuracy;

(E) if the positional difference estimated in step (C) has an acceptable accuracy, then updating the initial position using the positional difference and repeating steps (B)–(D); and (F) if the positional difference estimated in step (C) does not have an acceptable accuracy, then repeating steps (A)–(D).

19. An apparatus for tracking a position of a mobile unit in a mobile radio communication system using information from earth-orbiting satellites and information received from infrastructure of the system, wherein the infrastructure consists of equipment associated with transmitting and receiving voice or data traffic to and from the mobile phone, comprising:

(A) a controller that calculates an initial position of the mobile unit using measurements from earth-orbiting satellites;

(B) at least one receiver that receives first and second signals transmitted between the mobile unit and the infrastructure;

(C) wherein the controller calculates first and second range measurements using the first and second signals, and then estimates a positional difference between the initial position and a current position of the mobile station using the first and second range measurements, wherein only range measurements made from signals transmitted between the mobile unit and the infrastructure are used by the controller to estimate the positional difference;

(D) wherein the controller determines an accuracy value associated with the estimated positional difference and compares the accuracy value to a threshold to determine whether the estimated current positional difference has an acceptable accuracy;

(E) wherein, if the estimated positional difference has an acceptable accuracy, the controller updates the initial position using the positional difference; and (F) wherein, if the estimated positional difference does not have an acceptable accuracy, the controller determines a new initial position of the mobile unit using measurements from the earth-orbiting satellites.

20. An apparatus for tracking a position of a mobile unit in a mobile radio communication system using information from earth-orbiting satellites and information received from infrastructure of the system, wherein the infrastructure consists of equipment associated with transmitting and receiving voice or data traffic to and from the mobile phone, comprising:

(A) means for calculating an initial position of the mobile unit using measurements from earth-orbiting satellites;

(B) means for receiving first and second signals transmitted between the mobile unit and the infrastructure;

(C) means for calculating first and second range measurements using the first and second signals, and then estimating a positional difference between the initial position and a current position of the mobile station using the first and second range measurements, wherein only range measurements made from signals transmitted between the mobile unit and the infrastructure are used to estimate the positional difference;

(D) means for determining an accuracy value associated with the estimated positional difference and comparing the accuracy value to a threshold to determine whether the estimated positional difference has an acceptable accuracy;

(E) means for updating the initial position using the positional difference if the estimated positional difference has an acceptable accuracy; and (F) means for determining a new initial position of the mobile unit using measurements from the earth-orbiting satellites if the estimated positional difference does not have an acceptable accuracy.

21. An apparatus for tracking a position of a mobile unit in a mobile radio communication system using information from earth-orbiting satellites and information received from infrastructure of the system, wherein the infrastructure consists of equipment associated with transmitting and receiving voice or data traffic to and from the mobile phone, comprising:

(A) a controller that calculates an initial position of the mobile unit using measurements from earth-orbiting satellites and determines directional and velocity values associated with the mobile unit;

(B) a receiver that receives a first signal transmitted between the mobile unit and the infrastructure;

(C) wherein the controller calculates a first range measurement using the first signal, and then estimates a positional difference between the initial position and a current position of the mobile station using the first range measurement and the directional and velocity values, wherein only the directional and velocity values and one or more range measurements made from signals transmitted between the mobile unit and the infrastructure are used by the controller to estimate the positional difference;

(D) wherein the controller determines an accuracy value associated with the estimated positional difference and compares the accuracy value to a threshold to determine whether the estimated current positional difference has an acceptable accuracy;

(E) wherein, if the estimated positional difference has an acceptable accuracy, the controller updates the initial position using the positional difference; and (F) wherein, if the estimated positional difference does not have an acceptable accuracy, the controller determines a new initial position of the mobile unit using measurements from the earth-orbiting satellites.

22. An apparatus for tracking a position of a mobile unit in a mobile radio communication system using information from earth-orbiting satellites and information received from infrastructure of the system, wherein the infrastructure consists of equipment associated with transmitting and receiving voice or data traffic to and from the mobile phone, comprising:

(A) means for calculating an initial position of the mobile unit using measurements from earth-orbiting satellites and determining directional and velocity values associated with the mobile unit;

(B) means for receiving a first signal transmitted between the mobile unit and the infrastructure;

(C) means for calculating a first range measurements using the first signal, and then estimating a positional difference between the initial position and a current position of the mobile station using the directional and velocity values and first range measurement, wherein only the directional and velocity values and one or more range measurements made from signals transmitted between the mobile unit and the infrastructure are used to estimate the positional difference;

(D) means for determining an accuracy value associated with the estimated positional difference and comparing the accuracy value to a threshold to determine whether the estimated positional difference has an acceptable accuracy;

(E) means for updating the initial position using the positional difference if the estimated positional difference has an acceptable accuracy; and (F) means for determining a new initial position of the mobile unit using measurements from the earth-orbiting satellites if the estimated positional difference does not have an acceptable accuracy.

* * * * *